United States Patent
Kurose et al.

(10) Patent No.: US 7,859,598 B2
(45) Date of Patent: Dec. 28, 2010

(54) RECEIVING APPARATUS

(75) Inventors: Takahiro Kurose, Daito (JP); Toshihiro Takagi, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1180 days.

(21) Appl. No.: 11/455,675

(22) Filed: Jun. 20, 2006

(65) Prior Publication Data

US 2007/0006258 A1     Jan. 4, 2007

(30) Foreign Application Priority Data

Jun. 20, 2005   (JP)  ............... 2005-179445

(51) Int. Cl.
    *H04N 5/50* (2006.01)
(52) U.S. Cl. ................. 348/732; 348/731
(58) Field of Classification Search ......... 348/731–734
    See application file for complete search history.

(56) References Cited

U.S. PATENT DOCUMENTS

| | | | | |
|---|---|---|---|---|
| 6,864,926 B2 * | 3/2005 | Ohmatsu | ............ | 348/731 |
| 7,206,032 B2 * | 4/2007 | Shibusawa | ............ | 348/732 |
| 7,546,620 B2 * | 6/2009 | Takagi et al. | ............ | 725/38 |
| 7,568,212 B2 * | 7/2009 | Tsubouchi | ............ | 725/38 |

FOREIGN PATENT DOCUMENTS

| | | |
|---|---|---|
| JP | 2000-224552 | 8/2000 |
| JP | 2002-101353 | 4/2002 |
| JP | 2004-140598 | 5/2004 |

OTHER PUBLICATIONS

Japanese Office Action dated Aug. 10, 2010.

* cited by examiner

*Primary Examiner*—M. Lee
(74) *Attorney, Agent, or Firm*—Pillsbury Winthrop Shaw Pittman, LLP (57) ABSTRACT

When, for any channel registered in a channel table, a detecting means detects that no program is being broadcast, a registered channel changing means changes the channel registered in the channel table to a channel for which the detecting means has detected that a program is being broadcast.

3 Claims, 10 Drawing Sheets

9B: FAVORITE CHANNEL TABLE

| PHYSICAL CHANNEL | VIRTUAL CHANNEL | SUB-CHANNEL | BROADCAST SUSPENSION FLAG |
|---|---|---|---|
| 1 | 25 | 1 | OFF |
| 2 | 31 | — | OFF |
| 8 | 39 | 2 | ON |
| 13 | 55 | 1 | OFF |
| ⋮ | ⋮ | ⋮ | ⋮ |
| 76 | 43 | 2 | ON |
| 95 | 106 | 2 | OFF |
| 103 | 135 | 1 | OFF |

9A: ALL-CHANNEL TABLE

| PHYSICAL CHANNEL | VIRTUAL CHANNEL | SUB-CHANNEL |
|---|---|---|
| 1 | 25 | 1 |
| | | 2 |
| 2 | 31 | — |
| 4 | 18 | 1 |
| | | 2 |
| | 45 | 1 |
| ⋮ | ⋮ | ⋮ |
| 98 | 88 | 1 |
| | | 2 |
| 101 | 91 | 1 |
| | | 2 |
| 103 | 100 | 1 |
| | | 2 |

FIG.3

9B: FAVORITE CHANNEL TABLE

| PHYSICAL CHANNEL | VIRTUAL CHANNEL | SUB-CHANNEL | BROADCAST SUSPENSION FLAG |
|---|---|---|---|
| 1 | 25 | 1 | OFF |
| 2 | 31 | — | OFF |
| 8 | 39 | 2 | ON |
| 13 | 55 | 1 | OFF |
| ⋮ | ⋮ | ⋮ | ⋮ |
| 76 | 43 | 2 | ON |
| 95 | 106 | 2 | OFF |
| 103 | 135 | 1 | OFF |

RECEIVING APPARATUS

CROSS REFERENCE

This Nonprovisional application claims priority under 35 U.S.C. §119(a) on Patent Application No. 2005-179445 filed in Japan on Jun. 20, 2005, the entire contents of which are hereby incorporated by reference.

BACKGROUND OF THE INVENTION

The present invention relates to a receiving apparatus that receives a digital broadcast signal that is being broadcast on a tuned channel.

In digital broadcasting, as is publicly known, broadcasting can be performed by a stream in which data for a plurality of programs is multiplexed. That is, it is possible to broadcast a plurality of programs on one physical channel. Here, one physical channel means a channel that corresponds to a frequency band of a carrier wave used for program broadcast. With a digital broadcast, because a plurality of programs may be broadcast on one physical channel, it is necessary to decide the channel on which each program is broadcast. Thus, one or a plurality of virtual channels are assigned to a physical channel. Also, by assigning sub-channels, a virtual channel can be used as a plurality of channels that broadcast a program. For example, if a physical channel to which two virtual channel numbers "10" and "11" has been assigned, when broadcasting two programs, by using "10" as the channel number where one of the programs is being broadcast and using "11" as the channel number where the other program is being broadcast, it is possible to decide the channel on which each program is being broadcast. Also, if a physical channel to which one virtual channel number "20" has been assigned, when broadcasting two programs, by using sub-channel numbers "1" and "2", and using "20-1" as the channel number where one of the programs is being broadcast and using "20-2" as the channel number where the other program is being broadcast, it is possible to decide the channel on which each program is being broadcast. A user tunes a channel with a virtual channel or a virtual channel plus sub-channel.

Also, as disclosed in JP 2000-224552A and JP 2002-101353A, the digital broadcast receiving apparatus, at an appropriate time, detects whether or not each receivable physical channel is a channel on which a program is being broadcast, and performs a channel search in which, for each physical channel on which a program is being broadcast, for each program being broadcast on that physical channel, the virtual channels or the virtual channel plus sub-channel being used for program broadcast is registered in an all-channel table. The receiving apparatus, prevents tuning of a channel on which a program is not being broadcast by switching the channel (the virtual channel, or the virtual channel plus sub-channel) based on the all-channel table registration contents when a channel up/down operation has been performed by the user.

On the other hand, with a digital broadcast, the number of programs being broadcast on a physical channel changes dynamically. Thus, circumstances arise in which after the previous channel search, a channel on which program broadcast has been stopped (i.e., a channel on which a program is not being broadcast) is tuned, or in which after the previous channel search, a channel on which program broadcast has begun cannot be tuned. Accordingly, in the conventional technology, the all-channel table is updated by performing a channel search when the apparatus main body is powered on or the like. Also, as described in JP 2002-101353A, it has been proposed to detect channels on which a program is being broadcast, with respect to only a designated physical channel.

Also, with a digital broadcast, because a plurality of programs can be broadcast on one physical channel, the total number of programs being broadcast is large, and operations to tune the program that the user will view is troublesome. Accordingly, it is conceived to provide a favorite channel table, in which the user registers a channel (a virtual channel or a virtual channel plus sub-channel) on which a program they like is being broadcast, and when a channel up/down operation is performed by the user, switch channels based on the registered content of the favorite channel table, not the all-channel table.

However, when a configuration is adopted in which when it has been detected that a program is not being broadcast on a channel that is registered in the favorite channel table, this channel is deleted from the favorite channel table, a channel that the user registered in the favorite channel table is deleted from the favorite channel table without the user's knowledge. In this case, when the user checks the registered content of the favorite channel table, the user notices that the channel they registered is not registered in the favorite channel table. As a result, there is the problem that the user is made to feel uneasy that the receiving apparatus main body may be broken, confusing the user. Also, when the program broadcast stoppage on the channel deleted from the favorite channel table is temporary, there is the problem that it is necessary for the user to again perform the operation that registers the deleted channel in the favorite channel table, increasing the burden on the user, so operability is poor.

Also, when a configuration is adopted in which when it has been detected that a program is not being broadcast on a channel that is registered in the favorite channel table, this channel is not deleted from the favorite channel table, when the user tunes this channel, video and audio are not output. At this time, there is the problem that the user erroneously thinks that they made a mistake in the registration operation of the channel to the favorite channel table, and as a result the user is confused.

SUMMARY OF THE INVENTION

It is an object of the present invention to provide a receiving apparatus in which, using a channel table in which a user registers a channel that is broadcasting a program they like, operability for user channel tuning is improved, and the user is not confused.

The receiving apparatus of the present invention is provided with a registering means that registers a channel for which registration has been designated in a channel table. This receiving apparatus is also provided with a tuning receiving means that receives tuning of only a channel that is registered in the channel table, and a receiving means that receives a digital broadcast signal of the channel received by the tuning receiving means. This receiving apparatus is also provided with a detecting means that detects whether or not a program is being broadcast for each channel, and a registered channel changing means that, when a channel for which it has been detected by the detecting means that a program is not being broadcast is a channel that is registered in the channel table, changes the channel that is registered in the channel table to a channel for which it has been detected by the detecting means that a program is being broadcast at this point in time.

The channel designated for registration by the user is registered in the channel table by the registering means. This channel table is distinguished from the all-channel table, and is referred to as the favorite channel table. The tuning receiving means receives tuning of only channels that are registered in the channel table. Accordingly, the user can tune a channel to watch from the channels that are registered in the channel table. Also, when, for any channel registered in a channel table, the detecting means detects that no program is being broadcast, the registered channel changing means changes the channel registered in the channel table to a channel for which the detecting means has detected that a program is being broadcast at this point in time.

Accordingly, even when, for a channel that the user registered in the channel table, the detecting means detects that no program is being broadcast, the total number of channels that are registered in the channel table does not change. Also, it is possible to suppress a state in which a channel on which a program is not being broadcast is registered in the channel table. Thus, it is possible to prevent making the user feel uneasy that the receiving apparatus main body may be broken and confusing the user. Also, when the program broadcast stoppage on the channel deleted from the favorite channel table is temporary, when the user again registers the channel prior to the change in the channel table, it is not necessary to perform that operation from the beginning. That is, it is preferable that the user performs an operation that updates the channel that is registered in the channel table (the channel that was changed by the registered channel changing means) to the channel prior to the change, and so an improvement in operability can also be achieved.

Also, a configuration may be adopted in which a channel that the registered channel changing means registered in the channel table is changed to another channel in the same physical channel or the same virtual channel. Usually, the same classification of program is being broadcast on the same physical channel or the same virtual channel. That is, there is a high possibility that the same classification of program is being broadcast on the channel prior to the change (the channel that the user registered) and the channel after the change (the channel to which the registered channel changing means changed). Accordingly, there is a high possibility that the user will like the program being broadcast on the channel after the change, so the sense of discomfort imparted to the user when the channel changed to has been tuned is suppressed.

Further, a flag registering means that registers a change flag that indicates whether or not each channel that is registered in the channel table has been changed by the registered channel changing means, associated with each channel that is registered in the channel table, and a message output portion that, when the receiving apparatus has judged whether or not a channel for which the tuning receiving means received tuning has been changed by the registered channel changing means based on the change flags, and judged that the channel has been changed by the registered channel changing means, outputs a message indicating that the currently tuned channel has been changed by the changing means, may be added.

When configuring the receiving apparatus in this manner, it is possible to reliably prevent the user from being confused when they tune a channel that has been changed by the registered channel changing means.

DESCRIPTION OF THE INVENTION

Figure 1:
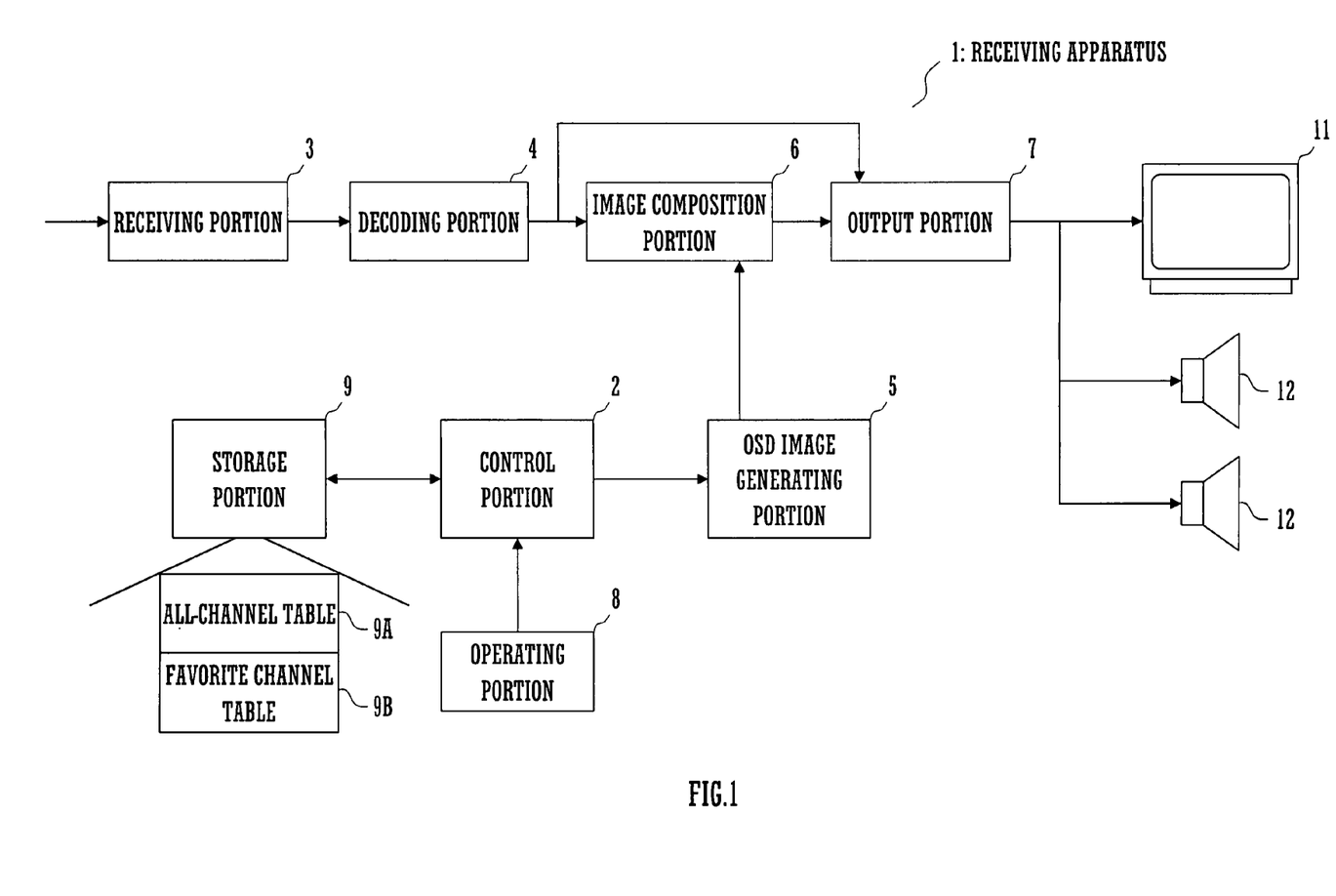
FIG. 1 is a block diagram that shows the configuration of the main portions of a receiving apparatus that is an embodiment of this invention.

FIG. 1 is a block diagram that shows the configuration of the main portions of a receiving apparatus that is an embodiment of the present invention. A receiving apparatus 1 of this embodiment is provided with a control portion 2 that controls the operation of the apparatus main body, a receiving portion 3 that receives a digital broadcast signal and extracts a stream of a physical channel that corresponds to a channel that is tuned (a channel tuned using a virtual channel or a virtual channel plus sub-channel), a decoding portion 4 that extracts and decodes video data and audio data of the channel that is tuned from the stream extracted by the receiving portion 3, an OSD image generating portion 5 that generates an OSD image, an image composition portion 6 that generates a composite image in which an OSD image generated by the OSD image generating portion 5 is superimposed, an output portion 7 that outputs a video signal and an audio signal, an operating portion 8 that receives input operation of the apparatus main body, and a storage portion 9 that stores an all-channel table 9A and a favorite channel table 9B, described below.

Here, a digital broadcast channel number is simply described. There are three elements in a digital broadcast channel number: a physical channel, a virtual channel, and a sub-channel. The physical channel corresponds to the frequency range of a carrier wave used for a program broadcast. With a digital broadcast, a plurality of programs can be broadcast on one physical channel. Accordingly, when a plurality of programs are being broadcast on one physical channel, virtual channels and sub-channels are used such that individual programs can be tuned. A virtual channel is a channel number that has been associated with a physical channel, and it is possible to assign one or a plurality of virtual channels to one physical channel. A sub-channel is used supplementally when one virtual channel is used as a plurality of channels. For example, in the case of a virtual channel "10", by using sub-channels "1" and "2", the virtual channel can be used as two channels "10-1" and "10-2".

When a virtual channel is used as a channel on which one program is broadcast, there may be instances when sub-channels are not used for this virtual channel.

The receiving portion 3 receives a physical channel that corresponds to a channel that is tuned using a virtual channel or a virtual channel plus sub-channel, and extracts a stream of a program being broadcast on this physical channel. In the stream that is received and extracted by the receiving portion 3, video data and audio data of all of the programs being broadcast on the tuned physical channel (the physical channel that corresponds to the channel that is tuned using a virtual channel or a virtual channel plus sub-channel) is multiplexed. In the receiving portion 3, an antenna that receives a digital broadcast is connected, but this is not shown in the figures. The decoding portion 4, from the stream extracted by the receiving portion 3, extracts video data and audio data of the channel that is tuned using a virtual channel or a virtual channel plus sub-channel, and decodes the video data and the audio data extracted here. The OSD image generating portion 5, as necessary, generates an OSD image such as the channel number that is tuned or a menu screen. The image composition portion 6 generates a composite image in which an OSD image generated by the OSD image generating portion is superimposed on video of the video data decoded by the decoding portion 4, and outputs video data of this composite image. The image composition portion 6, when a superimposed OSD image is not generated by the OSD image generating portion 5, outputs the video data input from the decoding portion 4. The video data output from the image composition portion 6 is input to the output portion 7. Also, the audio data decoded by the decoding portion 4 is output to the output portion 7. The output portion 7 generates a video signal based on the video data input from the image composition portion 6, and inputs this to a display apparatus 11. In the display apparatus 11, video based on the video signal input from the output portion 7, i.e., video of the program being broadcast on the channel that is tuned, is displayed. Also the output portion 7 inputs an audio signal based on the audio data input from the decoding portion 4 to a speaker 12. With the speaker 12, audio based on the audio signal input from the output portion 7, i.e., audio of the program being broadcast on the channel that is tuned, is output. The output portion 7 synchronizes the video signal input to the display apparatus 11 and the audio signal input to the speaker 12.

Figure 2:
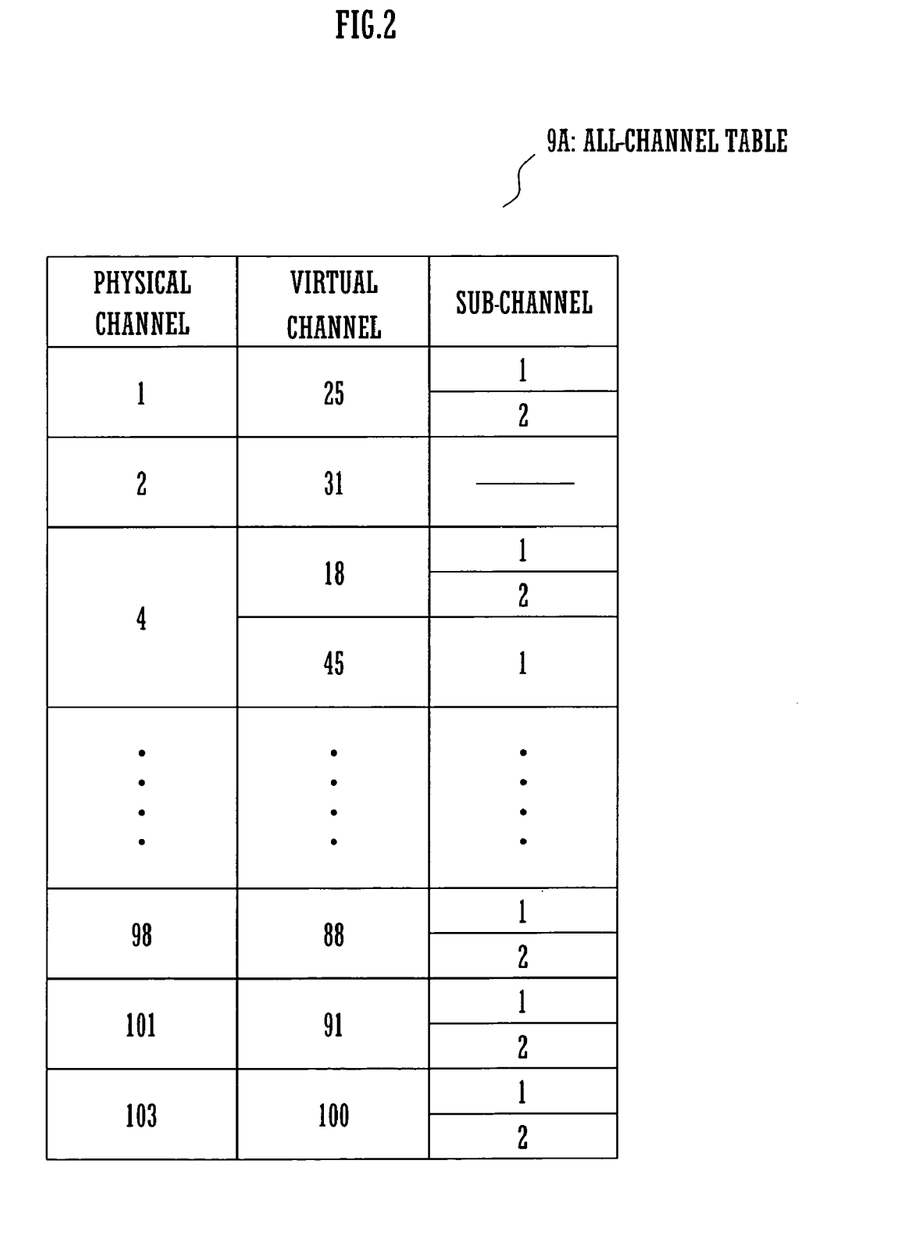
FIG. 2 shows an all-channel table of a receiving apparatus that is an embodiment of this invention.

The operating portion 8 includes a plurality of operating keys that perform an input operation for the apparatus main body, and a receiving portion that receives a control command for the apparatus main body transmitted from a remote control apparatus not shown in the figures. The receiving apparatus 1, when an operating key is operated, or when a control command for the apparatus main body transmitted from the remote control apparatus is received, judges that there was input to the apparatus main body. The control portion 2 of the receiving apparatus 1 controls operation of the apparatus main body according to input to the apparatus main body received by the operating portion 8. The storage portion 9 stores the all-channel table 9A and the favorite channel table 9B. The favorite channel table 9B corresponds to the channel table referred to in this invention. The storage portion 9 is configured with a nonvolatile memory. FIG. 2 shows the all-channel table 9A. In the all-channel table 9A, virtual channels and sub-channels are associated with each physical channel that is registered. The all-channel table 9A is a table in which all of the physical channels on which a program is being broadcast are registered. However, because detection of changes in the physical channels on which a program is being broadcast is difficult to perform in real time, there are instances when the registered content of the all-channel table and the configuration of each physical channel on which a program is being broadcast at that point in time are temporarily not in agreement. For example, at a time decided in advance such as when the power of the apparatus main body is off, the receiving apparatus 1 detects the channel configuration (virtual channels and sub-channels) for each physical channel on which a program is being broadcast, and performs processing that updates the registered content of the all-channel table 9A, or when the received physical channels were changed, detects the channel configuration for the changed physical channels, and performs processing that updates the corresponding channel registration content of the all-channel table 9A.

Figure 3:
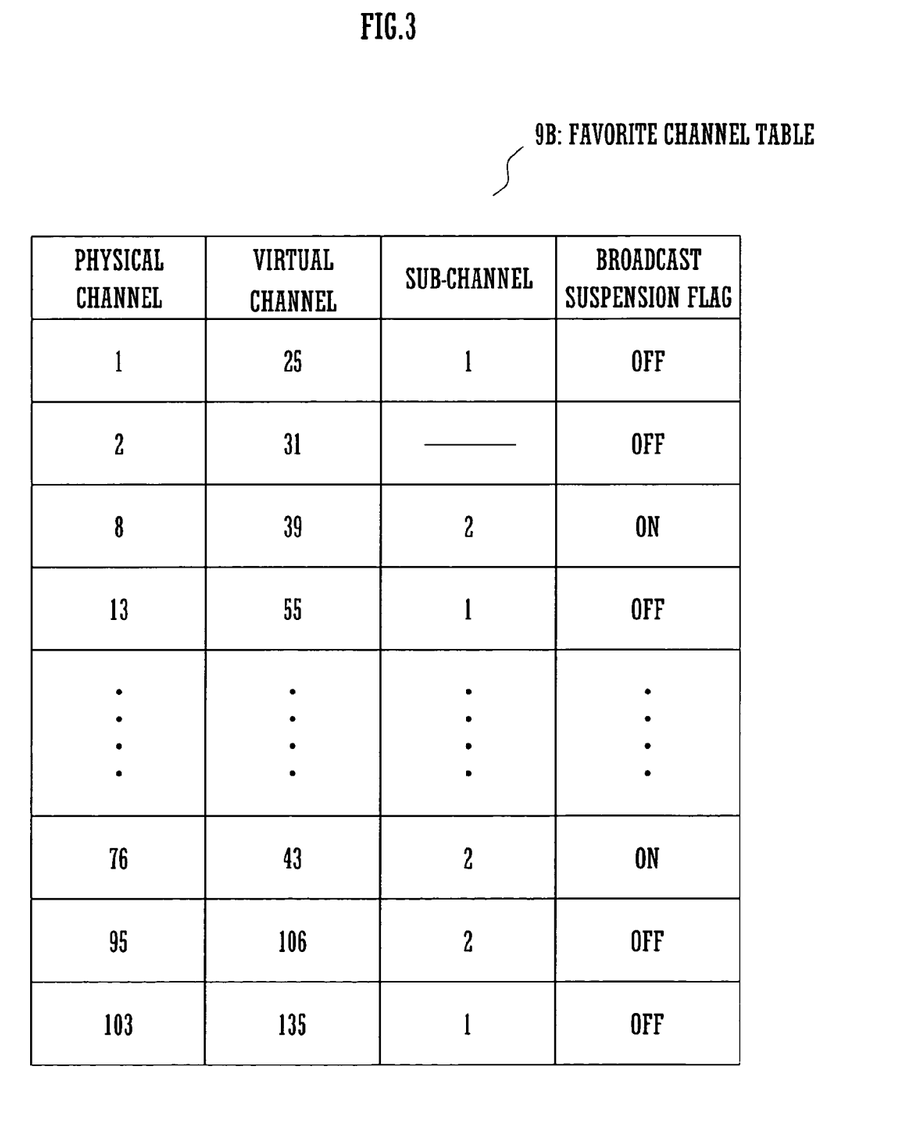
FIG. 3 shows a favorite channel table of a receiving apparatus that is an embodiment of this invention.

FIG. 3 shows a favorite channel table. In the all-channel table 9B, channels are registered with the units with which the channels are tuned. As shown in FIG. 3, physical channels and virtual channels (or virtual channels plus sub-channels) are associated. Tuning is performed using a virtual channel or a virtual channel plus sub-channel. Also, a virtual channel with which a sub-channel is not associated is a virtual channel in which a sub-channel is not used. By performing a predetermined input operation to the apparatus main body, the user can newly register a channel to the favorite channel table 9B or delete a channel from the favorite channel table 9B. Further, in the favorite channel table 9B, for each registered channel, a change flag that indicates whether or not that channel has been changed in the apparatus is stored associated with each registered channel. A channel whose change flag is turned on has been changed in the apparatus, and a channel whose change flag is turned off has been registered by the user.

Figure 4:
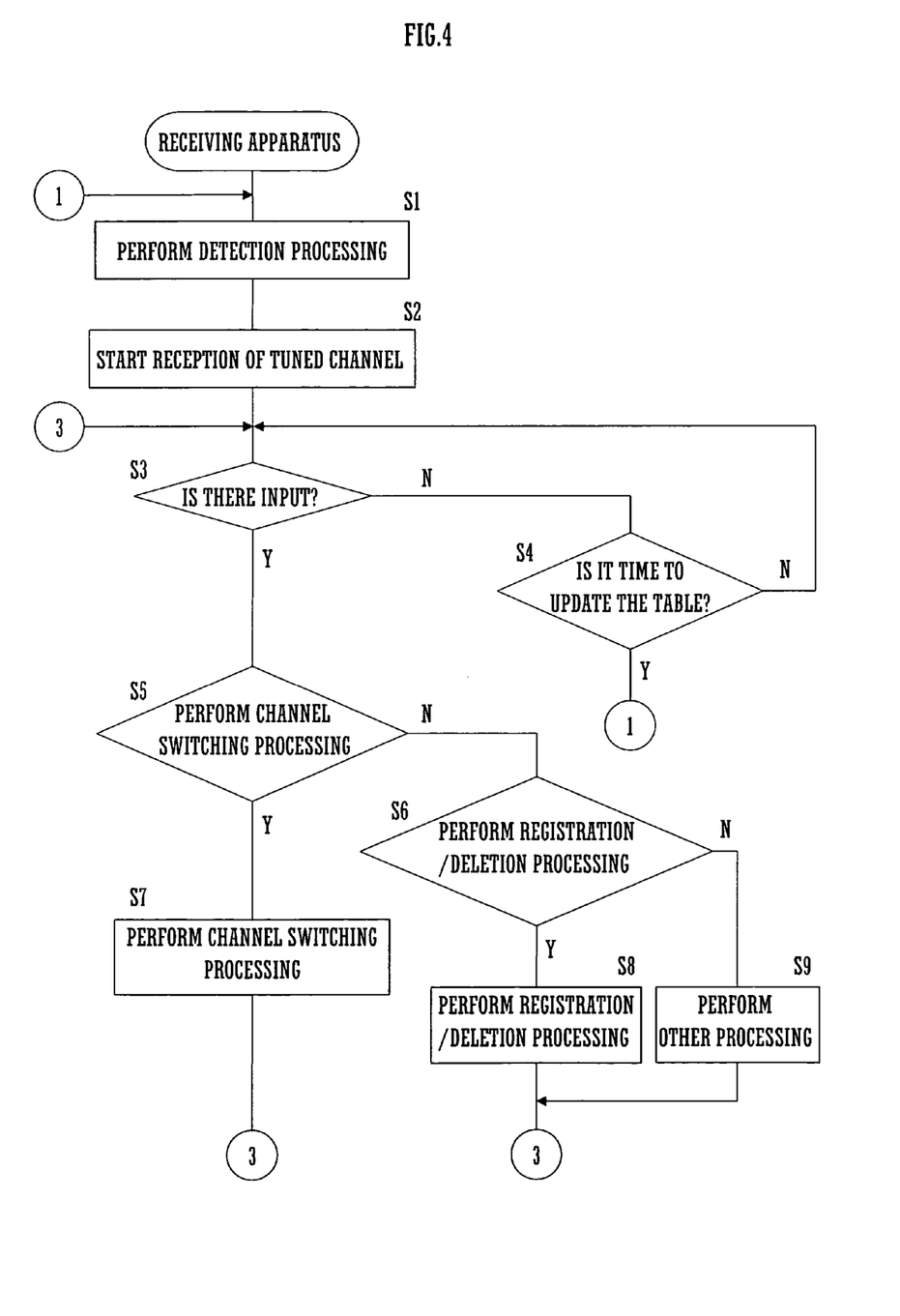
FIG. 4 is a flowchart that shows the operation of a receiving apparatus that is an embodiment of this invention.

Following is a description of the operation of the receiving apparatus 1, which is an embodiment of this invention. FIG. 4 is a flowchart that shows the operation of a receiving apparatus that is an embodiment of this invention. When power for the apparatus main body is turned on, the receiving apparatus 1 starts the processing shown in FIG. 4, and when power for the apparatus main body is turned off, the receiving apparatus 1 ends this processing. When power for the apparatus main body is turned on, the receiving apparatus 1 first detects whether or not a program is being broadcast for each channel registered in the favorite channel table 9B, and if there is a channel on which a program is not being broadcast, performs detection processing that changes that channel to a channel on which a program is being broadcast (S1).

Figure 5:
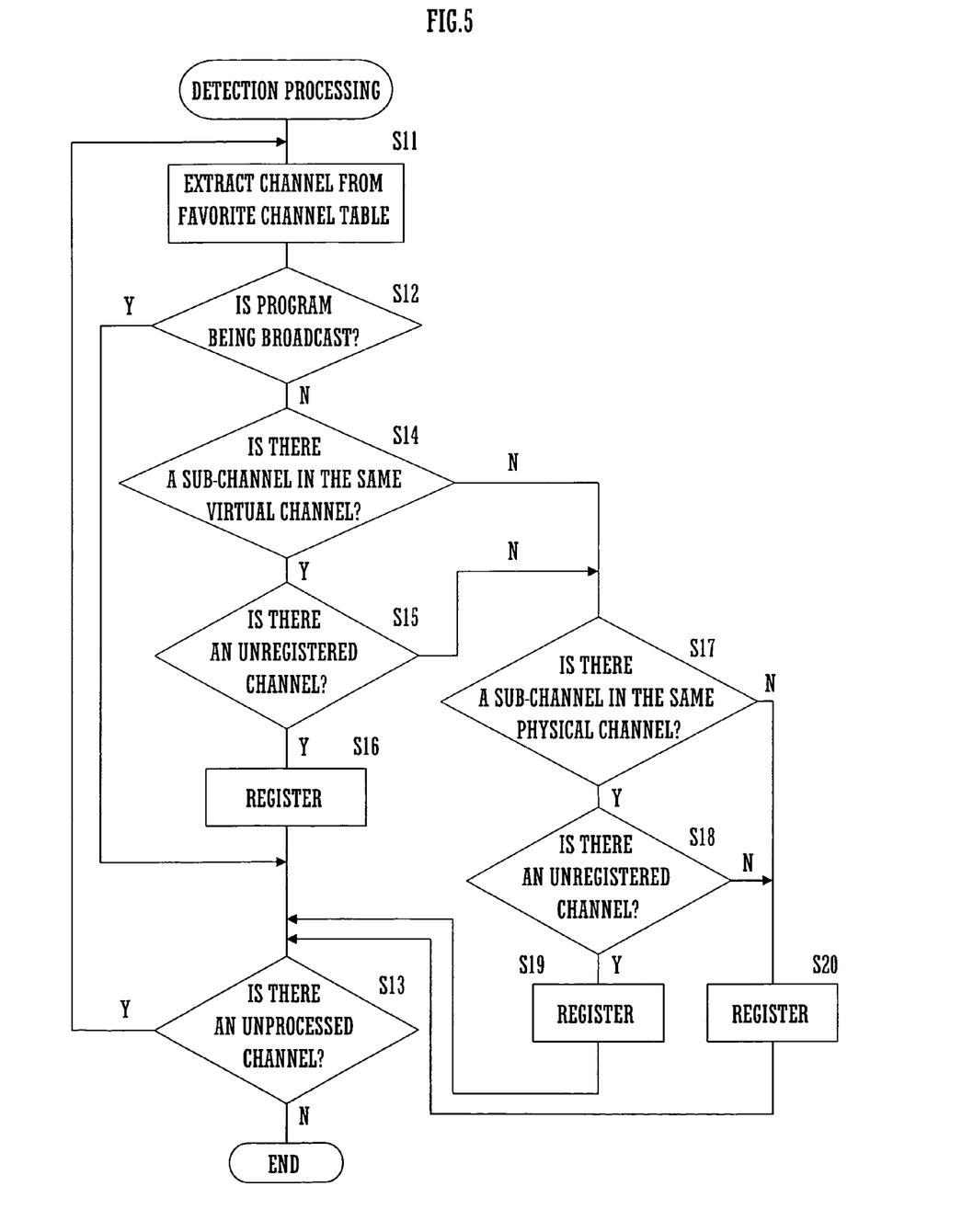
FIG. 5 is a flowchart that shows detection processing in a receiving apparatus that is an embodiment of this invention.

FIG. 5 is a flowchart that shows this detection processing. The receiving apparatus 1 extracts channels for which it will detect whether or not a program is being broadcast from the favorite channel table 9B (S11). The receiving apparatus 1 receives physical channels that correspond to the channels extracted in S11 with the receiving portion 3, processes the reception signal of these physical channels, and judges whether or not a program is being broadcast on the channels extracted from the current favorite channel table 9B (S12). When the receiving apparatus 1 judges that a program is being broadcast in S12, the receiving apparatus 1 judges, among the channels registered in the favorite channel table 9B, whether or not there are any channels (unprocessed channels) for which it has not been detected whether or not a program is currently being broadcast (S13), and if there is an unprocessed channel, the receiving apparatus 1 returns to S11 and repeats the processing above.

On the other hand, when the receiving apparatus 1 judges that a program is not being broadcast in S12, the receiving apparatus 1 judges whether or not there is a sub-channel on which a program is being broadcast in the same virtual channel as a channel for which it was detected that a program is not currently being broadcast (S14). When the receiving apparatus 1 judges that there is a sub-channel on which a program is being broadcast in the same virtual channel in S14, the receiving apparatus judges, among these sub-channels, whether or not there is a channel that is not registered in the favorite channel table 9B (S15). When the receiving apparatus 1 judges that there is a sub-channel that is not registered in the favorite channel table 9B in the same virtual channel in S15, the channel for which it was detected that there is not currently a program being broadcast is changed to the smallest sub-channel among the sub-channels that are not registered in the favorite channel table 9B (S16). As is clear from the above description, the channel changed to in S16 is in the same physical channel and virtual channel as the channel that was registered, but the sub-channel is different.

A configuration is adopted in which the channel changed to in S16 is the smallest sub-channel, but the channel changed to may be decided by another method, such as changing to the largest sub-channel.

When the receiving apparatus 1 has judged that there is not a sub-channel on which a program is being broadcast in the same virtual channel in S14, or that there is not a sub-channel that is not registered in the favorite channel table 9B in S15, the receiving apparatus 1 judges whether or not there is a virtual channel on which a program is being broadcast in the same physical channel as a channel for which it has been detected that a program is not currently being broadcast (S17). When the receiving apparatus 1 judges that there is a virtual channel on which a program is being broadcast in the same physical channel in S17, the receiving apparatus 1 judges, among these virtual channels, whether or not there is a channel that is not registered in the favorite channel table 9B (S18). When the receiving apparatus 1 judges in S18 that there is a channel that is not registered in the favorite channel table 9B in the same physical channel, a channel for which it has been detected that a program is not currently being broadcast is changed to a channel that belongs to the smallest virtual channel among the virtual channels that include a channel that is not registered in the favorite channel table 9B, and that is the smallest sub-channel that is not registered in the favorite channel table 9B in this virtual channel (S19). As is clear from the above description, the virtual channel for the channel changed to in S19 differs from the virtual channel for the channel that was registered, but the physical channel is the same.

A configuration is adopted in which in S19, the channel changed to is the smallest virtual channel, and the smallest sub-channel in that virtual channel is used, but the channel changed to may be decided by another method, such as changing to the largest virtual channel or the largest sub-channel.

Further, when the receiving apparatus 1 judges in S17 that there is not a virtual channel on which a program is being broadcast in the same physical channel, and judges in S18 that there is not a channel that is not registered in the favorite channel table 9B in the same physical channel, a channel for which it has been detected that a program is not currently being broadcast is changed to a channel that is not registered in the favorite channel table 9B, and that belongs to the physical channel with the smallest difference with the physical channel that corresponds to the channel for which it has been detected that a program is not currently being broadcast and on which a program is being broadcast, and belongs to the smallest virtual channel that includes a channel that is not registered in the favorite channel table 9B in this physical channel, and is the smallest sub-channel that is not registered in the favorite channel table 9B in this virtual channel (S20).

Also, the receiving apparatus 1 turns on the change flag associated with the changed channel when it performs the processing in S16, S19, or S20. When the receiving apparatus 1 completes the processing in S16, S19, or S20, it executes the processing in S13. When the receiving apparatus 1 judges in S13 that there are no unprocessed channels, it ends main processing.

When, by a user operation, a channel has been registered in the favorite channel or a registered channel has been changed/updated, the receiving apparatus 1 turns off the change flag associated with this channel.

When the processing in S1 is completed, the receiving apparatus 1 starts reception of the program being broadcast by the tuned channel (when power is on, the channel that was tuned when the receiving apparatus 1 was previously turned off) (S2). The tuned channel referred to here is the channel tuned with a virtual channel or a virtual channel plus sub-channel. In S2, the receiving portion 3 starts reception of the digital broadcast signal of the physical channel that corresponds to the tuned channel. The receiving portion 3 outputs a stream of the physical channel that is being received. The decoding portion 4 extracts video data and audio data of the program being broadcast on the tuned channel from the stream output from the receiving portion 3, and starts processing that decodes that data. The image compositing portion 6 starts processing that generates video data of a composite image in which an OSD image generated by the OSD image generating portion 5 is superimposed on video of the video data that has been decoded by the decoding portion 4. When an OSD image has not been generated by the OSD image generating portion 5, the image compositing portion 6 outputs the video data that has been decoded by the decoding portion 4. The output portion 7 outputs a video signal based on the video data output from the image compositing portion 6, and starts processing that outputs an audio signal based on the audio data that has been decoded by the decoding portion 4. Thus, video of the program being broadcast on the tuned channel is displayed in the display apparatus 11, and audio of this program is output from the speaker 12.

When a program is not being broadcast on the tuned channel, a configuration may be adopted in which an OSD image that informs that a program is not being broadcast is displayed in the display apparatus 11, and a configuration may be adopted in which an appropriate channel on which a program is being broadcast is tuned and the processing in S2 is performed.

When the receiving apparatus 1 starts receiving the channel tuned in S2, the receiving apparatus 1 judges whether there is an input to the apparatus main body (S3), and whether it is time to update the favorite channel table 9B (S4). In S4, for example, the receiving apparatus 1 judges whether or not a fixed amount of time, for example one hour, has passed since the previous update of the favorite channel table 9B. In this case, in the receiving apparatus 1, the last time that the favorite channel table 9B was updated is stored in a memory (not shown) provided in the control portion 2, and a timer (not shown) that clocks the present time is provided. When the difference between the time clocked by this timer and the stored last time that the favorite channel table 9B was updated is more than the fixed amount of time, the receiving apparatus 1 judges that the fixed amount of time has passed since the previous update of the favorite channel table 9B. When the receiving apparatus 1 judges in S4 that it is time to update the favorite channel table 9B, the receiving apparatus 1 returns to S1 and executes the change processing described above.

In this way, the receiving apparatus 1 periodically detects whether or not a program is being broadcast for each channel that is registered in the favorite channel table 9B, and if a channel on which a program is not being broadcast is registered, changes this channel to a channel on which a program is being broadcast.

Also, because a program broadcast is usually started at a time with an even cutoff such as on the hour, the judgment in S4 may be replaced with processing that judges whether or not the time is on the hour. Further, when the change processing in S1 is performed, because reception of the channel tuned at that point in time is temporarily suspended, a configuration may be adopted in which, for example, the channels that are registered in the favorite channel table 9B are divided into two groups, and the above change processing is performed alternately for the channels in one group and the channels in the other group. If such a configuration is adopted, the amount of time that reception of the tuned channel is suspended is suppressed, so it is possible to suppress the sense of discomfort imparted to the user who is viewing the program that is being broadcast on the channel tuned at that point in time.

The user performs a desired input operation of the receiving apparatus 1 by operating an operating key provided in the operating portion 8 or a remote control apparatus (not shown). When there is an input to the apparatus main body, the receiving apparatus 1 judges whether the current input is a request for channel switching using the favorite channel table 9B, and whether the current input is a request for processing to register/delete a channel to the favorite channel table 9B (S5, S6). When it is judged in S5 that the current input is a request for channel switching using the favorite channel table 9B, the receiving apparatus 1 performs channel switching processing using the favorite channel table 9B shown in the FIG. 6 (S7).

Figure 6:
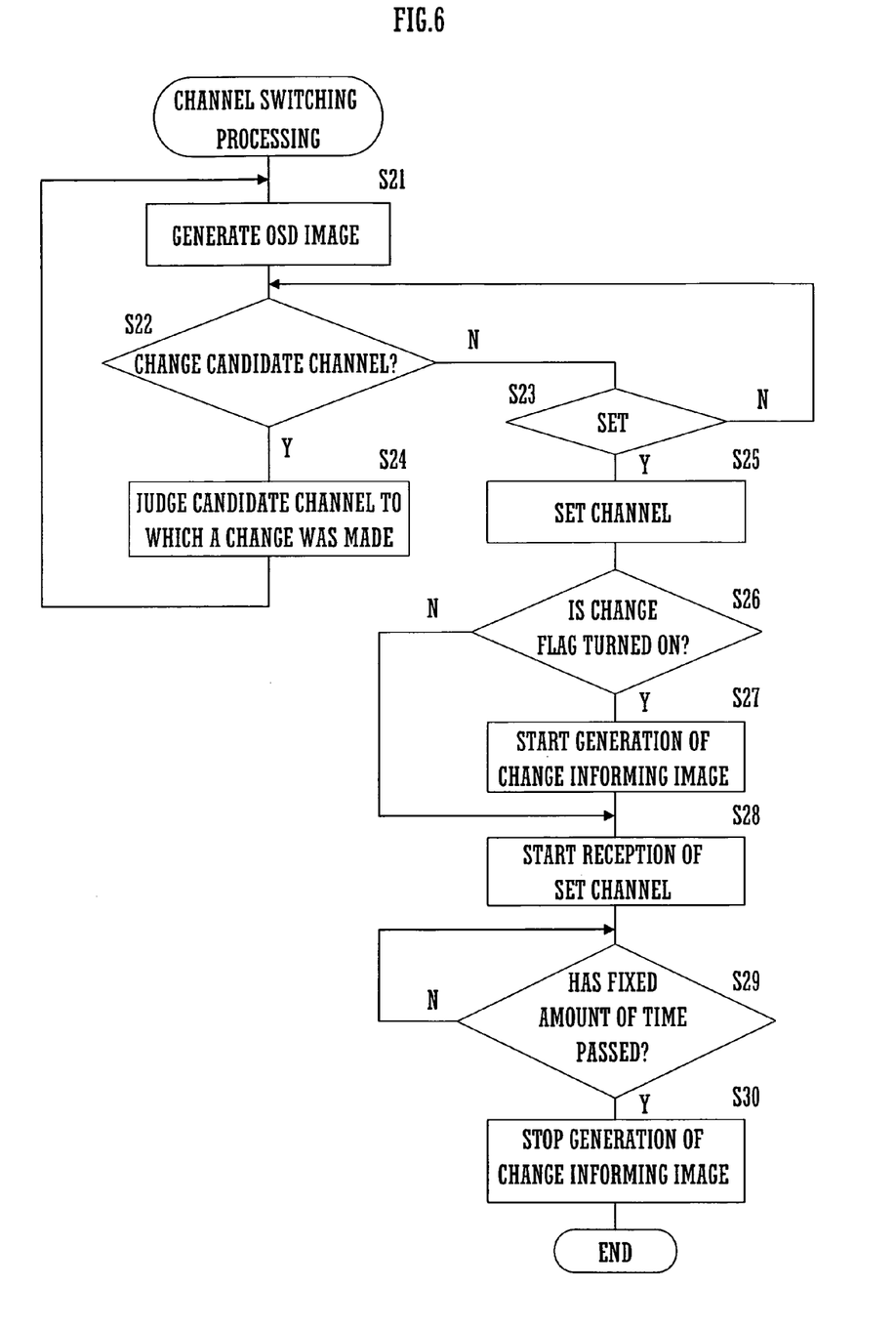
FIG. 6 is a flowchart that shows channel switching processing in a receiving apparatus that is an embodiment of this invention.
Figure 7:
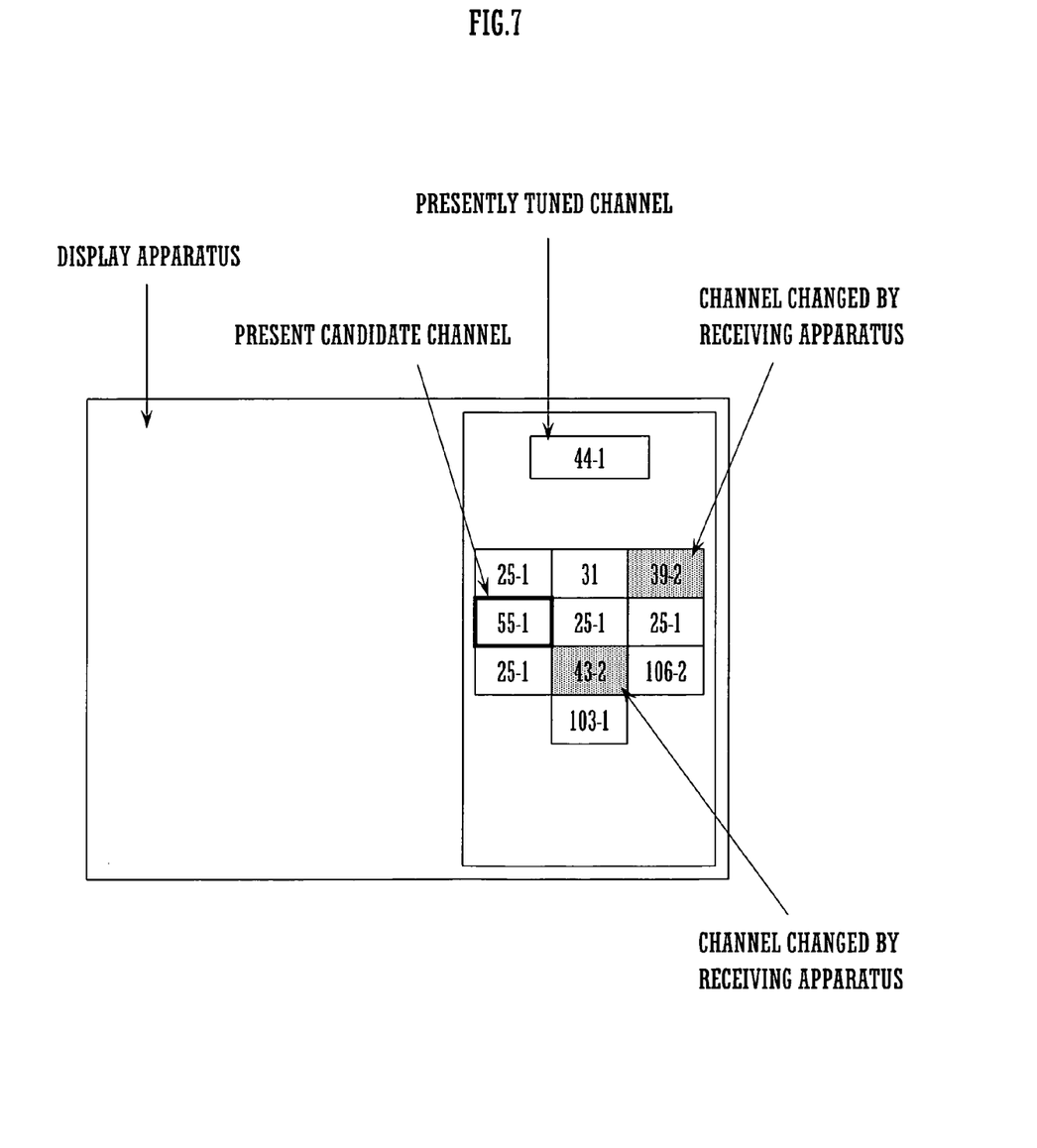
FIG. 7 shows an OSD image generated during the channel switching processing in the receiving apparatus that is an embodiment of this invention.

Following is a description of the channel switching processing using the favorite channel table 9B in the receiving apparatus 1. The receiving apparatus 1, in the OSD image generating portion 5, from the channels that are registered in the favorite channel table 9B, generates an OSD image that assists an operation that tunes the channel to which the channel is changed (S21). In S21, the OSD image generating portion 5 creates an OSD image in which channels whose change flag is turned on and channels whose change flag is turned off in the favorite channel table 9B are distinguished. The receiving apparatus 1, from the output portion 7, outputs a video signal of a composite image in which the OSD image generated by the OSD image generating portion 5 in S21 is superimposed on the video of the program being broadcast on the channel that is presently tuned (the channel before being switched). In the display apparatus 11, to which this video signal is being input, for example, the video shown in FIG. 7 is displayed. In FIG. 7, the video of the program being broadcast on the channel that is presently tuned is not shown. In FIG. 7, the channel independently displayed above the screen is the channel that is presently tuned. Also, a plurality of channels displayed segregated below the presently tuned channel are channels that are registered in the favorite channel table 9B, and the shaded channels are channels whose change flag is turned on. Further, the channel with a frame is the channel selected as a candidate to be switched to at this point in time (below, referred to as the candidate channel).

Accordingly, by performing an input operation for a channel switching request using the favorite channel table 9B, the user can check the channels that are registered in the favorite channel table 9B at that point in time. Also, channels that are registered in the favorite channel table 9B and have been changed in the receiving apparatus 1 by the change processing described above are displayed in a different form than channels that were registered by a user operation in the display apparatus 11, so the user can simply confirm channels that have been changed in the receiving apparatus 1.

The receiving apparatus 1 waits for change of the candidate channel or input of a selection decision (S22, S23). The user performs input to change the candidate channel by operating cursor keys of the operating portion 8 or a remote control apparatus. When there is input to change the candidate channel, the receiving apparatus 1 judges the candidate channel to which a change was made (S24). In S24, specifically, if the key operated by the user is a right cursor key, in the OSD image generated in S21, the channel displayed adjacently to the right of the presently selected candidate channel is set to be the candidate channel. In the receiving apparatus 1, an OSD image in which the position of the frame has been changed according to the set candidate channel is generated by the OSD image generating portion 5. Accordingly, the user can check switching of the candidate channel on the screen of the display apparatus 11.

The candidate channel to be updated next for the channel on the right end is the channel displayed on the left end in one row below in the OSD image. Also, the candidate channel to be updated next for the channel on the right end in the bottommost row is the channel displayed on the left end in the uppermost row. When the left cursor key, up cursor key, or down cursor key has been operated, only the movement direction (movement direction in the OSD image) of the candidate channel to be updated relative to the candidate channel at that point in time differs, and so a description thereof is omitted here.

Figure 8:
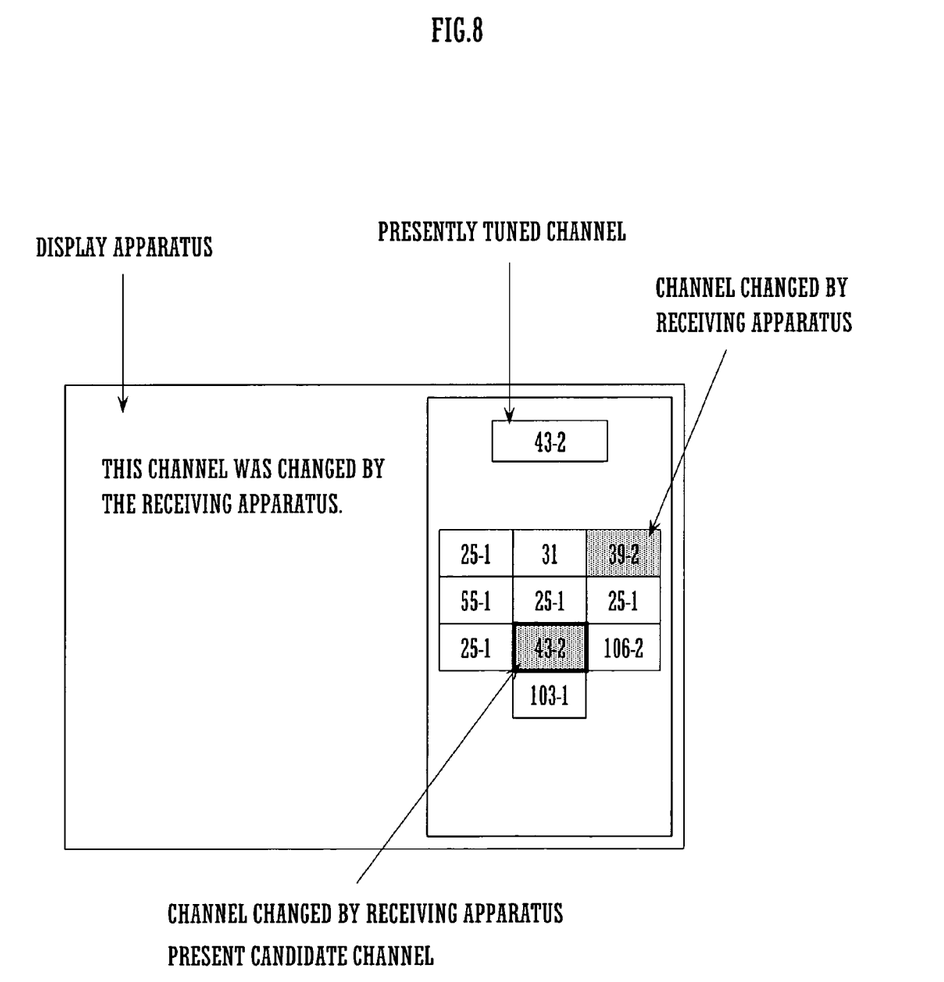
FIG. 8 shows an OSD image generated during the channel switching processing in the receiving apparatus that is an embodiment of this invention.

Also, when the receiving apparatus 1 judges in S23 that there was input of a selection decision, the candidate channel provisionally set at that point in time is set to the channel to be tuned (S25), the receiving apparatus 1 judges whether the change flag associated with this channel is on or off (S26). When the receiving apparatus 1 judges that the change flag is on, it generates an OSD image (change informing image) with the OSD image generating portion 5 that informs that the channel was changed in the receiving apparatus 1 (S27), and starts reception of the channel set in S25 (S28). Accordingly, when a channel that is registered in the favorite channel table 9B and has been changed in the receiving apparatus 1 has been tuned, a message that informs that the currently tuned channel has been changed in the receiving apparatus 1 is displayed in the display apparatus 11 (see FIG. 8). Accordingly, even when the user has tuned a channel that has been changed in the receiving apparatus 1, the user can confirm that the currently tuned channel has been changed in the receiving apparatus 1, and the user is not confused even if the program being broadcast on the tuned channel is not one that the user likes.

Figure 9:
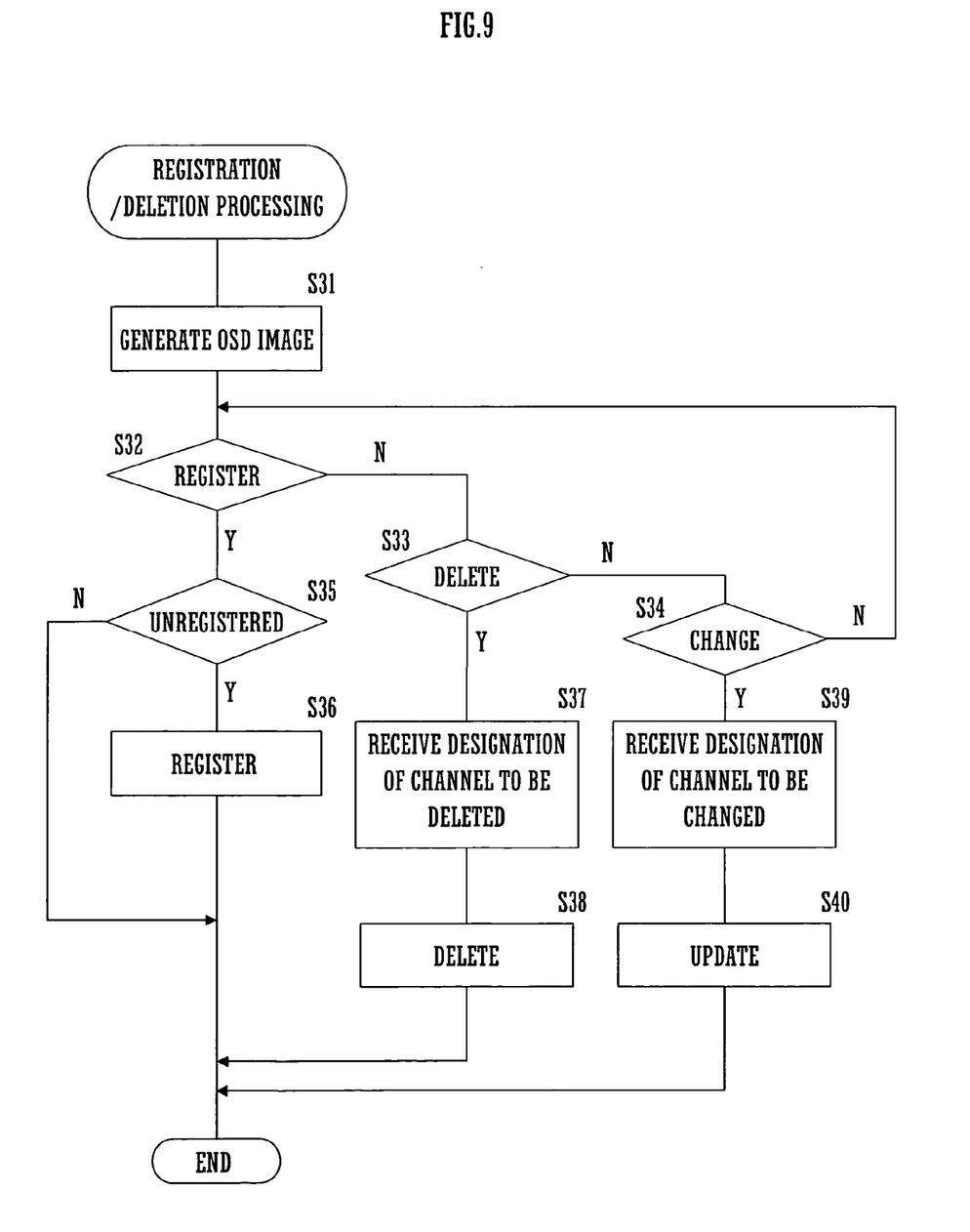
FIG. 9 is a flowchart that shows registration/deletion processing in a receiving apparatus that is an embodiment of this invention.
Figure 10:
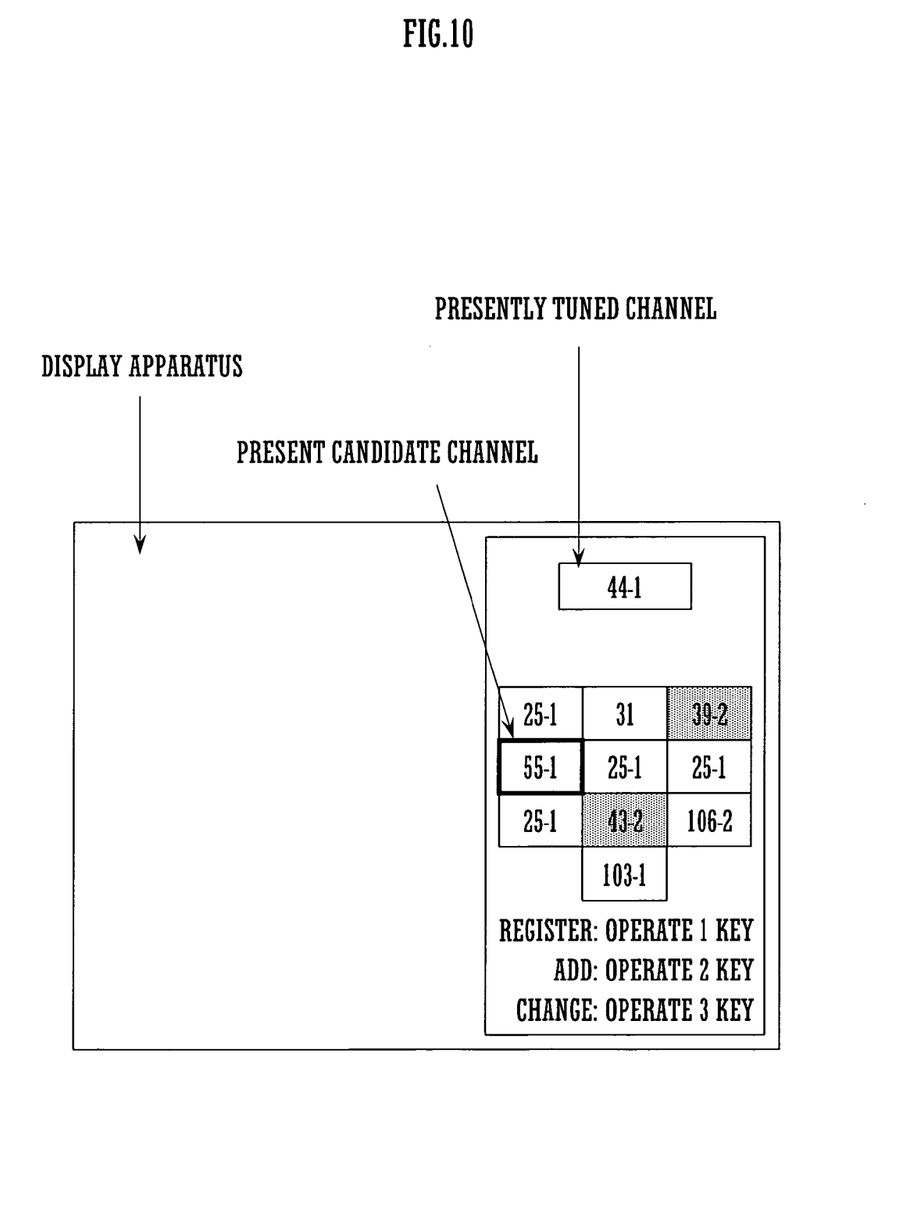
FIG. 10 shows an OSD image generated during the registration/deletion processing in a receiving apparatus that is an embodiment of this invention.

When a fixed amount of time, for example 5 seconds, passes after starting generation of the change informing image in S27, the receiving apparatus 1 stops generation of this change informing image (S30) and returns to S3. Also, when the receiving apparatus 1 judges in S6 that the current input is a request for processing to register/delete a channel to the favorite channel table 9B, the receiving apparatus 1 executes the registration/deletion processing shown in FIG. 9 (S8). The receiving apparatus 1 generates an OSD image with the OSD image generating portion 5 that assists registration of channels to or deletion of channels from the favorite channel table 9B (S31). The OSD image generated in S31 is approximately the same as the OSD image shown in FIG. 7. In S31, same as in S21, the an OSD image is created in which channels whose change flag is turned on and channels whose change flag is turned off are distinguished. The receiving apparatus 1, from the output portion 7, outputs a video signal of a composite image in which the OSD image generated by the OSD image generating portion 5 in S31 is superimposed on the video of the program being broadcast on the channel that is presently tuned. In the display apparatus 11, for example, the video shown in FIG. 10 is displayed. In FIG. 10, the video of the program being broadcast on the channel that is presently tuned is not shown. Also, in FIG. 10 the channels shown shaded are the channels whose change flag is turned on. Accordingly, the user can simply confirm the channels that have been changed in the receiving apparatus 1 by viewing this image.

The receiving apparatus 1 here waits for input for registration, deletion or change (S32 to S34). When the input to the main body is registration, the receiving apparatus 1 judges whether or not the channel tuned at this point in time is already registered in the favorite channel table 9B (S35), and if not yet registered, newly registers the presently selected channel in the favorite channel table 9B (S36). When the input to the main body is deletion, the receiving apparatus 1 receives designation of the channel to be deleted (S37), and deletes the channel that has been designated here from the favorite channel table 9B (S38). The user, same as registration of a channel in the channel switching processing using the favorite channel table 9B described above, selects the channel to be deleted by operating a cursor key. However, the receiving apparatus 1 receives selection of a channel to be deleted irrespective of the state of the change flag. That is, it is possible to select a channel to be deleted from the favorite channel table 9B regardless of whether the change flag is turned on or turned off.

Further, when input to the main body is a change, the receiving apparatus 1 receives designation of the channel to be changed (a channel that is registered in the favorite channel table 9B) (S39), and updates the channel designated here to the channel that is tuned at this point in time (S40). In this case as well, same as registration of a channel in the channel switching processing using the favorite channel table 9B described above, the user selects the channel to be changed by operating a cursor key. In this manner, the receiving apparatus 1 of this embodiment can register a desired channel to the favorite channel table 9B or delete an unnecessary channel that is registered.

Also, when the receiving apparatus 1 judges that the input to the apparatus main body is the channel switching processing using the favorite channel table 9B described above, or processing other than registration/deletion processing, the receiving apparatus 1 executes processing (that other processing) for that input (S9). In S9, for example, channel switching processing using the all-channel table 9A, or processing such as an all-channel search that detects channels on which a program is being broadcast for each receivable physical channel, is performed. By switching channels using the all-channel table 9A, a channel that is not registered in the favorite channel table 9B can be tuned. Also, the all-channel table 9A is updated in the all-channel search.

In this manner, when it has been detected that a program is not being broadcast on a channel that is registered in the favorite channel table 9B, the receiving apparatus 1 of this embodiment changes this channel to a channel on which a program is being broadcast, so it is possible to prevent tuning a channel on which a program is not being broadcast. Also, in the favorite channel table 9B, when the program broadcast was suspended temporarily, when the user again registers the channel prior to the change in the channel table, it is not necessary to perform that operation from the beginning. That is, it is preferable that the user performs an operation that updates the channel that is registered in the channel table (the channel that was changed in the receiving apparatus 1) to the channel prior to the change. Accordingly, an improvement in operability is achieved.

Finally, the embodiments described above are to be considered in all respects as illustrative and not limiting. The scope of the invention is indicated by the appended claims rather than by the foregoing embodiments. Furthermore, all changes which come within the meaning and range of equivalency of the claims are intended to be embraced in the scope of the invention.

What is claimed is:

1. A receiving apparatus comprising:
   a designation means for designating a channel;
   a storage means that stores an all-channel table and a designated channel table, the all-channel table showing a correspondence relationship between a physical channel and a virtual channel regarding all channels on which programs are broadcast, the designated channel table showing a correspondence relationship between a physical channel and a virtual channel regarding the channel, in the all channels, designated by the designation means;
   a registering means that registers in the designated channel table, the channel designated by the designation means;
   a tuning receiving means that receives tuning of only the channel that is registered in the designated channel table;
   a receiving means that receives a digital broadcast signal of a tuned channel received by the tuning receiving means;
   a detecting means that detects whether or not a program is being broadcast for each channel regarding the channel registered in the designated channel table;
   a changing means that changes the channel in the designated channel table for which it has been detected by the detecting means that a program is not being broadcast, to a channel for which it has been detected by the detecting means that a program is being broadcast at this point in time;
   a flag registering means that registers a change flag that indicates whether or not each channel that is registered in the designated channel table has been changed by the changing means, associated with each channel that is registered in the designated channel table; and
   a message output means that
      judges, based on the change flags, whether or not the tuned channel for which the tuning receiving means received tuning has been changed by the changing means, and
      outputs a message indicating that the currently tuned channel has been changed by the changing means when judging that the tuned channel has been changed by the changing means.

2. The receiving apparatus according to claim 1, wherein the changing means changes the channel registered in the designated channel table to a channel on which a program is being broadcast in the same physical channel as that channel.

3. The receiving apparatus according to claim 1, wherein the changing means changes a channel registered in the designated channel table to a channel on which a program is being broadcast in the same virtual channel as that channel.

* * * * *